United States Patent Office 3,746,752
Patented July 17, 1973

3,746,752
PROCESS FOR PREPARATION OF
AROMATIC CARBOXYLATES
Donald G. Kuper, Bartlesville, Okla., assignor to
Phillips Petroleum Company
No Drawing. Filed Oct. 18, 1971, Ser. No. 190,285
Int. Cl. C07c 63/14, 63/26, 63/34
U.S. Cl. 260—515 P                                      8 Claims

ABSTRACT OF THE DISCLOSURE

An alkali metal salt of an aromatic carboxylic acid is recrystallized from a water solution in the presence of an organic compound selected from the group consisting of alcohols, esters and ketones. The recrystallized salt is thereafter utilized in a disproportionation process wherein the alkali metal salt is converted to an aromatic polycarboxylate containing at least one additional carboxylate group.

This invention relates to the production of aromatic polycarboxylates. In one aspect this invention relates to the production of aromatic polycarboxylates by disproportionation of alkali metal salts of aromatic carboxylic acids. In another aspect this invention further relates to the recrystallization of alkali metal salts of aromatic carboxylic acids, prior to disproportionation.

It is well known in the art that alkali metal salts of carboxylic acids having carboxyl groups which are attached to aromatic ring systems can be converted, i.e., transformed, into salts of different carboxylic acids having at least two carboxyl groups in the molecule by heating the said alkali metal salts to elevated temperatures in the presence of a compatible gas atmosphere. It is also known that this transformation is a solid state reaction, that is, the alkali metal salt is heated in the solid state to produce the transformation, called disproportionation, with the product also being in the solid state. This solid state reaction has caused considerable difficulties in the art with respect to its being used in commercial operations. One of these difficulties is that during the solid state reaction the solids fuse to form large solids, herein referred to as clinkers, which plug the reactor and which are extremely difficult if not impossible to handle, thereby fouling the reactor, causing process interruptions and problems in separation and recovery of the product.

It is thus an object of this invention to provide an improved process for the disproportionation of carboxylic acid salts.

Another object of this invention is to provide a process wherein the carboxylic acid salts subjected to disproportionation are first preconditioned by a recrystallization procedure.

Other aspects, objects and the several advantages of this invention will be apparent to one skilled in the art from the following specification and appended claims.

In accordance with this invention I have discovered that the disproportionation process for the conversion of an alkali metal salt of an aromatic carboxylic acid to an aromatic polycarboxylate is improved by subjecting the alkali metal salt, prior to disproportionation, to a recrystallization procedure, and then utilizing the recrystallized alkali metal salt in the disproportionation process with the result being that the mixture of solid reactants and solid product produced in the disproportionation is in a free-flowing form comprised of finely divided particles from which the product can be conveniently removed. There is thus provided an improved disproportionation process for the conversion of an alkali metal salt of an aromatic carboxylic acid to an aromatic polycarboxylate containing at least one additional carboxylate group wherein a recrystallized alkali metal salt of an aromatic carboxylic acid and a disproportionation catalyst is subjected to heating at an elevated temperature in the presence of a compatible gas atmosphere to thus form the desired polycarboxylate product.

The recrystallization procedure for the preconditioning of the alkali metal salt comprises the steps of completely dissolving the alkali metal salt in a suitable quantity of water to form a solution and thereafter heating the solution to remove the water from the solution by distillation wherein the distillation is conducted in the presence of an organic compound selected from the group consisting of alcohols, esters and ketones. The distillation is continued until crystals of the dissolved alkali metal salt first begin to form in the solution at which time heating is terminated. Upon termination of heating, crystallization continues as the solution cools. When the solution has cooled sufficiently, e.g., approximately to room temperature, the crystal-containing solution is then subjected to a step wherein the crystals are recovered from solution by suitable means such as, for example, filtration, and the recovered crystals of alkali metal salt are then dried to remove residual water and organic compound. The dried crystals are then utilized in the disproportionation process.

The filtrate is comprised of water, the organic compound and dissolved alkali metal salt. This filtrate can be recycled wherein additional alkali metal salt is dissolved therein and the resulting solution again subjected to the above-described recrystallization procedure.

Potassium benzoate recrystallized according to the above procedure has been observed to consist of irregular-shaped platelets having maximum diameters mostly in the range of 0.5 to 2 mm. The platelets were observed to be easily cleaved and, in many instances, appeared to be two or more crystals adhering together with their flat faces being parallel.

Examination of a typical commercially available potassium benzoate sample revealed the following. Although the commercially available sample appeared, without magnification, to be a powder, at a modest magnification (96×), it was observed to be in the form of platelets but much smaller than the potassium benzoate platelets produced according to the recrystallization procedure of this invention. Most of the platelets of the representative commercially available potassium benzoate sample had maximum diameters in the range of 0.006 to 0.06 mm. with a very small portion of them having diameters ranging up to about 0.3 mm. It was observed that these small crystals tended to mat together in an apparently random arrangement and were not as easily dispersed for examination as the very free-flowing recrystallized potassium benzoate particles produced according to the recrystallization procedure of this invention.

The alkali metal salts of aromatic carboxylic acids which are subjected to the preconditioning recrystallization procedure of this invention are produced according to conventional processes. According to one technique, potassium benzoate is prepared by neutralizing benzoic acid with potassium hydroxide and thereafter the resulting solution is subjected to spray drying in order to produce the commercial potassium benzoate product. It is the spray dried product, for example, which is subjected to the recrystallization procedure of this invention.

The organic compounds useful herein as codistillation agents are selected from the group consisting of alcohols, esters and ketones. The preferred organic compounds contain in the range of from 1 to 12 carbon atoms per molecule. Those organic compounds of particular importance which fall within the scope of alcohols, esters and ketones are selected from compounds represented by any one of the following general formulas: $R^1OH$, $R^2CO_2R^3$ and $R^4COR^5$ wherein $R^1$, $R^2$, $R^3$, $R^4$ and $R^5$ are linear or branched alkyl or alkenyl, or cycloalkyl or cycloalkenyl, or alkylcycloalkyl, or alkenylcycloalkyl hydrocarbon radicals and further wherein $R^1$ has 1 to 12 carbon atoms, and $R^2$, $R^3$, $R^4$, and $R^5$ have 1 to 10 carbon atoms.

Some alcohols useful herein as the organic codistillation agent and which fall within the scope of the formula $R^1OH$ include methanol, 2-ethyl-1-decanol, 1-hexanol, 3-methyl-3-buten-1-ol, cyclohexanol, 4-methylcyclohexanol, 4-cyclohexene-1-ol, ethanol, 2-propanol, 1-butanol and 4-methyl-3-cyclohexene-1-ol.

Some esters useful herein as the organic codistillation agent and which fall within the scope of the formula $R^2CO_2R^3$ include methyl acetate, 2-methyl-nonyl acetate, methyl decanoate, isopropyl crotonoate, methyl formate, undecyl formate, cyclohexyl acetate, 3-cycloheenyl acetate, 4-methylcyclohexyl acetate, 4-methyl-3-cyclohexen-1-yl butyrate, delta-valerolactone, ethyl acetate and isobutyl isovalerate.

Some ketones which are useful herein as the organic codistillation agent and which fall within the scope of the above formula $R^4COR^5$ include acetone, 2-dodecanone, 5-methyl-2-hexanone, 5-hexen-2-one, ethyl cyclohexyl ketone, methyl 4-methylcyclohexyl ketone, methyl 3-cyclohexenyl ketone, methyl 4-ethyl-3-cyclohexen-1-yl ketone, cyclohexanone and 4-ethylcyclohexanone.

The quantity of the organic compound utilized as the codistillation agent in the recrystallization procedure of this invention is in the range of 4 to 12 parts by weight of organic compound per 1 part by weight of the water utilized to dissolve the alkali metal salt. The actual quantity of organic compound required to effect efficient recrystallization differs from compound to compound. Thus, the required minimum amount of a particular organic compound elected for use is a subject for appropriate experimentation on the part of a user. However, the quantity of compound required to effectively produce the desired result herein is within the above-designated range of 4 to 12 parts by weight of organic compound per 1 part by weight of water utilized to dissolve the alkali metal salt of the carboxylic acid.

The distillation of the alkali metal salt-water solution is conducted, as previously stated, in the presence of the above-defined organic compound. The organic compound can be introduced into the solution in a variety of ways. For example, the organic compound can be added to the solution during the distilling step and continued until the alkali metal salt first begins to form crystals in the solution at which time the addition of organic compound and heating is terminated. According to this technique the solution can be heated until boiling begins at which point the organic compound is added dropwise to the boiling solution with stirring until the first crystals appear at which time, as previously noted, organic compound addition and heating is terminated. The condensate produced can be ether discarded or it can be recycled to the distillation zone. If the discard procedure is elected, then the total quantity of organic compound added to the distillation zone will be from a feed source. However, if the recycle procedure is elected, then the total quantity of organic compound added to the distillation zone will be from a feed source as well as from the recycle. In certain instances the condensate will form a two-phase mixture in the condensate receiver, said two-phase mixture consisting of the organic compound phase and a water phase. In this case the water phase is discarded and the organic phase can be recycled to the distillation zone. Where the recycle method is chosen, the user will again be required to experiment as above indicated in order to determine the quantity of organic compound feed required to produce the desired result. However, the total quantity of organic compound utilized is within the above-specified range.

In another technique for contacting the water-salt solution with the organic compound codistillation agent, the total quantity of organic compoud is added directly to the solution prior to the distilling step. That is, the water-salt solution is prepared and thereafter prior to the commencement of heating in the distillation step, the total quantity of organic compound required is added directly to the solution. As a variation of this technique, the total quantity of organic compound required is added to the solution after heating is commenced at a time when, due to distillation of the water, the solution is nearly saturated. As previously indicated, heating continues until crystals first begin to form in the solution, at which time heating is terminated.

It was mentioned above that the alkali metal salt of the aromatic carboxylic acid is completely dissolved in a suitable quantity of water. The actual quantity of water utilized is critical only to the extent that it be in sufficient quantity to completely dissolve all of the alkali metal salt at the boiling point of water. The suitable quantity of water utilized, however, can be sufficient to provide a weight ratio of alkali metal salt to water in the range of 1:9 to 7:3. This range of weight ratios would provide alkali metal salt-water solutions of 10 percent to 70 percent by weight of salt per total weight of solution. A preferred solution is a 50 percent by weight alkali metal salt per total weight of solution which, stated in weight ratios, is 1 part by weight of alkali metal salt per 1 part by weight water.

When the alkali metal salt of the aromatic carboxylic acid to be recrystallized and subsequently disproportionated to an aromatic polycarboxylate is potassium benzoate, the preferred organic compounds for use herein include 1-butanol, 5-methyl-2-hexanone and ethyl acetate.

In a preferred embodiment, the alkali metal salt of the aromatic carboxylic acid is potassium benzoate, the disproportionation catalyst is cadmium carbonate, and the reaction product is dipotassium terephthalate. In addition, in the preferred embodiment, the compatible gas is carbon dioxide. Potassium cyanate, which serves as a promoter for the disproportionation reaction, may also be added but is not required.

In a broader aspect of this invention in addition to recrystallization and disproportionation of the presently preferred alkali metal salts of benzoic acid, the salts of other aromatic mono- or polycarboxylic acids can be used. Such salts are those of the formula

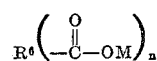

wherein $R^6$ is an aromatic, alkyl-aromatic or arylaromatic group having 6 to 15 carbon atoms therein, M is an alkali metal and $n$ is the integer 1, 2 or 3. Such salts are readily prepared from the corresponding acids. Such acids include, for example, benzoic acid, 2-naphthalene carboxylic acid, 4-biphenylcarboxylic acid, 5-butyl-1-naphthalene carboxylic acid, 2,6 - naphthalene dicarboxylic acid, phthalic acid, isophthalic acid, terephthalic acid, 2-anthracenecarboxylic acid, 1,5 - anthracenedicarboxylic acid, 3 - methyl - 1,5,8-anthracenetricarboxylic acid, 3-phenanthrenecarboxylic acid, 2,3,4-trimethylbenzenecarboxylic acid, and the like.

When aromatic monocarboxylic acid salts are used as starting materials for the process according to the invention, the reaction products obtained thereby are industrially valuable alkali metal salts of dicaboxylic acids which can be readily converted to the corresponding dicarboxylic acids; for example, dipotassium terephthalate is readily converted to terephthalic acid.

The disproportionation reaction can be carried out with or without catalysts; however, the reaction is favorably influenced by the presence of catalysts. Metals such as zinc, cadmium, mercury, lead, and iron, as well as compounds of these metals such as their oxides and salts formed with inorganic or organic acids and their metalorganic or their complex compounds, among others, their cabonates, bicarbonates, halides, sulfates, formates, phosphates, oxalates, fatty acid salts or the salts of the above metals formed with those acids which may serve as starting materials for the reaction or which are formed by this reaction, for example, their benzoates, phthalates or terephthalates, may be used as catalysts.

Preferred catalysts are, for example, iron, lead, zinc, mercury, cadmium, and their compounds, such as oxides, organic and inorganic salts, etc., although other metals and compounds may be used. Such compounds as metallic cadmium, cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, cadmium isophthalate, cadmium terephthalate, metallic zinc, zinc oxide, zinc iodide, zinc chloride, zinc sulfate, zinc phosphate, zinc carbonate, zinc acetate, zinc soaps, zinc benzoate, zinc phthalate, zinc isophthalate, zinc terephthalate, and other metals and compounds can be used as catalysts.

The amount of catalyst used can vary within wide limits and can range from 0.1 to 100 grams of catalyst per mol of aromatic carboxylate employed, more preferably in the range of 1 to 50 grams per mol. The catalysts may be used as such or supported on carriers such as kieselguhr, and may be recovered from the insoluble residues of the reaction and reused in many instances without further purification.

The conversion of the alkali metal carboxylate is effected substantially completely in the absence of oxygen or water. In general, temperatures in the range of about 350 to 500° C. are employed, and more preferably in the range of 400 to 450° C.

The process of this invention can be carried out in a compatible gas atmosphere. Examples of such compatible gases include nitrogen, methane, argon, neon, butane, ethane, helium and the like. In one embodiment of the invention there is utilized an atmosphere which contains additionally at least 50 mol percent carbon dioxide. However, the presence of carbon dioxide in the atmosphere in which the thermal conversion is carried out is not essential to the obtaining of the high conversion of initial reactant. In addition, carbon monoxide or a mixture of CO and $CO_2$ can be used in carrying out the process of the invention.

Pressures in the range of 0 p.s.i.g. to 5000 p.s.i.g. or more can be employed, but it is advantageous and preferable, in keeping with one embodiment of the instant invention, that lower pressures in the range of 0 to 1000 p.s.i.g. be employed.

Sufficient reaction time should be employed to effect the desired degree of conversion. Generally, reaction times in the range of about 5 minutes to about 48 hours are suitable.

In addition, the disproportionation reaction can be promoted by addition of alkali metal salts, preferably potassium salts of derivatives of cyanic acid or its polymers, to the reaction mixture. Suitable polymers or derivatives of cyanic acid are, for example, cyanuric acid, cyanamide and dicyandiamide. The derivatives of cyanic acid are preferably employed in the form of their potassium salts, provided they form salts with alkali metals. In many cases the use of potassium cyanate offers special advantages.

The aromatic polycarboxylates which are produced by the disproportionaction reaction can be converted to the corresponding aromatic polycarboxylic acids or may be converted directly to other products. Conversion to the corresponding aromatic carboxylic acids can be accomplished in several ways, e.g., by discharging into water the disproportionation reaction product mixture, removing insolubles by filtration, acidifying the filtrate to precipitate the aromatic polycarboxylic acids, filtering, washing and drying. Among possible variations is the use of reactant aromatic acid as the acidifying agent with consequent recycle of the alkali metal by conversion of said aromatic acid to its alkali metal salt suitable for conversion to platelet form before charging as a reactant, thus permitting continuous process operation.

The following examples will enable persons skilled in the art to better understand and practice the invention. However, the examples are not intended to limit the scope of this invention.

EXAMPLE I

Commercially available potassium benzoate (200 g.) was dissolved in water (300 ml.). This solution was heated to boiling and 100 ml. of water were removed by distillation. 1-butanol (approximately 125 ml.) was added and the distillation was continued. An additional 160 ml. of water (260 ml. total) was removed by codistillation to a water separator with return of the alcohol to the distillation flask. At this point, the first crystals of potassium benzoate appeared and the mixture was allowed to cool to room temperature with recovery by filtration of 166.6 g. potassium benzoate in platelet form.

EXAMPLE II

Commercially available potassium benzoate (3.2 g., 0.0200 mole), cadmium carbonate (0.20 g., 0.00116 mole) and potassium cyanate (0.10 g., 0.0012 mole) were intimately mixed (mortar and pestle), dried approximately 2 hours at 140° C. at reduced pressure and charged to a stainless steel tubular reactor of 30 ml. volume. Air was displaced from the reactor and contents with carbon dioxide and the reactor was sealed under a carbon dioxide atmosphere at 0 p.s.i.g. The reactor was placed in an oven which had been preheated to 441° C. and left there under autogenous pressure for 2 hours and then removed and allowed to cool to room temperature, weighed, and analyzed for product dipotassium terephthalate and unreacted potassium benzoate. The results are shown in Table I below.

EXAMPLE III

Following exactly the procedure of Example II, a companion run was made employing the platelet potassium benzoate prepared in Example I above. The results of the run are shown in Table I below.

TABLE I

| Example | Form of $C_6H_5CO_2K$ charged | Conversion weight percent | Selectivity to $p\text{-}C_6H_4(CO_2K)_2$ weight percent | Condition of product |
|---|---|---|---|---|
| II | Commercial | 98 | 85 | Solid plug. |
| III | Platelet | 99 | 85 | Powder. |

The advantage of the use of platelet potassium benzoate over commercial potassium benzoate is readily apparent by comparing the results of Example II with the results of Example III.

EXAMPLE IV

Potassium benzoate was recrystallized from various water-organic solvent combinations in the following manner: commercially available potassium benzoate (20.0 g.) was dissolved in water (100 ml.). This mixture was heated to boiling and then the organic compound for codistillation was added dropwise with continued heating and stirring to effect the codistillation, discarding the distillate, until concentration had proceeded to the point that the first crystals appeared in this stirred mixture. The mixture was then cooled to room temperature and the resulting solids were collected by filtration. The results obtained with this recrystallization process by employing various organic compounds is shown in Table II:

TABLE II

| Organic compound | Recovered potassium benzoate, g. | Crystal type |
|---|---|---|
| 1-butanol | 17.5 | Platelets. |
| Ethyl acetate | 14.5 | Do. |
| 5-methyl-2-hexanone | 19.0 | Do. |
| Anisole | 15.9 | Granular*. |
| Di(n-butyl)ether | 18.8 | Do. |
| Ethylene chloride | 12.4 | Do. |
| Toluene | 17.4 | Do. |

*"Granular" means that the recrystallization did not produce the desired platelets.

EXAMPLE V

Potassium benzoate (3.2 g., 0.02 mole) and cadmium carbonate (0.20 g., 0.00116 mole) were intimately mixed and this mixture was dried for approximately 2 hours at 160° C. at reduced pressure. This benzoate-carbonate mixture was charged to a stainless steel, tubular reactor of 30 ml. volume. Air was displaced from the reactor and contents with carbon dioxide and the reactor was sealed under a carbon dioxide atmosphere at 200 p.s.i.g. The reactor was then placed in an oven which had been preheated to 441° C. and left there under pressure autogenous above 200 p.s.i.g. for 2 hours and then allowed to cool to room temperature, weighed, and analyzed for product dipotassium terephthalate and unreacted potassium benzoate. The results are shown in Table III.

TABLE III

| Form of $C_6H_5CO_2K$ | Conversion of $C_6H_5CO_2K$, weight percent | Selectivity to p-$C_6H_4(CO_2K)_2$, weight percent | Appearance of p-$C_6H_4(CO_2K)_2$ |
|---|---|---|---|
| Granular* (not recrystallized) | 66.2 | 79.7 | Solid plug. |
| Granular* (recrystallized from anisole) | 88.0 | 92.0 | Do. |
| Platelet (recrystallized from ethyl acetate) | 77.5 | 79.5 | Free-flowing. |
| Platelet (recrystallized from 5-methyl-2-hexanone) | 79.0 | 78.6 | Do. |

*"Granular" means that the recrystallization did not produce the desired platelets.

EXAMPLE VI

Potassium benzoate was recrystallized from water in the following manner: Commercially available potassium benzoate (15.0 g.) was dissolved in water (50 ml.). This mixture was heated to boiling and stirred to effect distillation until concentration had proceeded to the point that the first crystals appeared. The mixture was then cooled to room temperature and the resulting solids were collected by filtration. The results obtained with this recrystallization process are as follows:

Organic compound _____ None.
Recovered potassium benzoate, g. _____ 11.8.
Crystal type _____ Semi-platelet.

EXAMPLE VII

Potassium benzoate from Example VI (3.2 g., 0.02 mole) and cadmium carbonate (0.20 g., 0.00116 mole) were intimately mixed and this mixture was dried for several days at 110° C. at reduced pressure. This benzoate-carbonate mixture was charged to a stainless steel, tubular reactor of 30 ml. volume. Air was displaced from the reactor and contents with carbon dioxide and the reactor was sealed under a carbon dioxide atmosphere at 200 p.s.i.g. The reactor was then placed for 2 hours in an oven which had been preheated to 441° C. with reaction occurring under pressure autogenous above 200 p.s.i.g. The product mixture was allowed to cool to room temperature, weighed, and analyzed for product dipotassium terephthalate and unreacted potassium benzoate. The results are shown in Table IV below.

TABLE IV

Form of $C_6H_5CO_2K$ _____ Semi-platelet.
Conversion of $C_6H_5CO_2K$, wt. percent ___ 82.
Selectivity to p-$C_6H_4(CO_2K)_2$, wt. percent _____ 84.
Appearance of p-$C_6H_4(CO_2K)_2$ _____ Solid plug.

From the above Examples I through VII, it is seen that potassium benzoate which is recrystallized from a water solution in the presence of an alcohol, an ester or a ketone, and which is thereafter utilized in a disproportionation reaction for the production of dipotassium terephthalate, results in a disproportionation product which is free-flowing. It is also seen from the above Examples I through VII that potassium benzoate which is recrystallized solely from a water solution or in the presence of a compound not within the scope of this invention, and thereafter the recovered potassium benzoate is utilized in a disproportionation process for the production of dipotassium terephthalate, that the disproportionation product is not free-flowing but is rather in the form of a solid plug. In addition, it is seen in Example II that consistent with the prior art the disproportionation of commercially available potassium benzoate results in a disproportionation product in the form of a solid plug.

Reasonable variations and modifications may be made in the foregoing disclosure without departing from the spirit or scope thereof.

That which is claimed is:

1. In a disproportionation process for the conversion of an alkali metal salt of an aromatic carboxylic acid to an aromatic polycarboxylate containing at least one additional carboxylate group comprising heating said alkali metal salt in a compatible gas atmosphere in the presence of a disproportionation catalyst, the improvement which comprises subjecting said alkali metal salt, prior to heating, to a recrystallization procedure comprising the steps of (A) dissolving said alkali metal salt in a suitable quantity of water to form a solution, (B) distilling said water from said solution in the presence of an amount in the range of from 4 to 12 parts by weight, per 1 part by weight of said water in said solution, of an organic compound selected from compounds represented by the formulas $R^1OH$, $R^2CO_2R^3$, and $R^4COR^5$ wherein $R^1$, $R^2$, $R^3$, $R^4$ and $R^5$ are linear or branched alkyl, alkenyl, cycloalkyl, cycloalkenyl, alkylcycloalkyl, or alkenylcycloalkyl hydrocarbon radicals and wherein said compound contains from 1 to 12 carbon atoms per molecule, until said alkali metal salt first begins to form crystals in said solution, (C) cooling the resulting crystal-containing solution, and thereafter (D) recovering said crystals of alkali metal salt from said crystal-containing solution.

2. The process of claim 1 wherein said organic compound is added to said solution during said distilling step until said alkali metal salt first begins to form crystals in said solution.

3. The process of claim 1 wherein the total quantity of said organic compound is present in said solution prior to said distilling step.

4. The process of claim 1 wherein the weight ratio of said alkali metal salt to said water in said solution is in the range of 1:9 to 7:3.

5. The process of claim 1 wherein said alkali metal salt is potassium benzoate.

6. The process of claim 5 wherein said organic compound is 1-butanol.

7. The process of claim 5 wherein said organic compound is ethyl acetate.

8. The process of claim 5 wherein said organic compound is 5-methyl-2-hexanone.

References Cited

Sherwood Chemistry and Industry (1960), pp. 1096–1100.

JAMES A. PATTEN, Primary Examiner